July 10, 1962 W. T. HARRIS 3,044,028
MAGNETIC CIRCUIT ELEMENT TRANSDUCER
Filed April 23, 1958

INVENTOR.
WILBUR T. HARRIS
BY Mitchell & Bechert
ATTORNEYS

United States Patent Office 3,044,028

Patented July 10, 1962

3,044,028

MAGNETIC CIRCUIT ELEMENT TRANSDUCER

Wilbur T. Harris, Southbury, Conn., assignor to The Harris Transducer Corporation, Woodbury, Conn., a corporation of Connecticut Filed Apr. 23, 1958, Ser. No. 730,373
5 Claims. (Cl. 333—71)

This invention relates to magnetostrictive devices and more particularly, to magnetostrictive impedance elements, sometimes known as circuit element transducers.

It is a general object of the invention to provide improved magnetostrictive impedance elements of the character indicated and having very sharp resonant peaks.

It is a specific object of the invention to provide magnetostrictive impedance elements which are easily fabricated and assembled.

It is another specific object of the invention to provide magnetostrictive elements operative in the high-frequency range, said elements being of improved construction, permitting simplified winding techniques.

It is a further specific object of the invention to provide magnetostrictive impedance elements which permit greater design flexibility and selection of advantageous material properties.

Other objects and various features of novelty and invention will be pointed out or will occur to those skilled in the art from a reading of the following specification in conjunction with the accompanying drawings. In said drawings, which show, for illustrative purposes only, preferred forms of the invention:

Figures 1, 2, 3, 4, 5, 6:
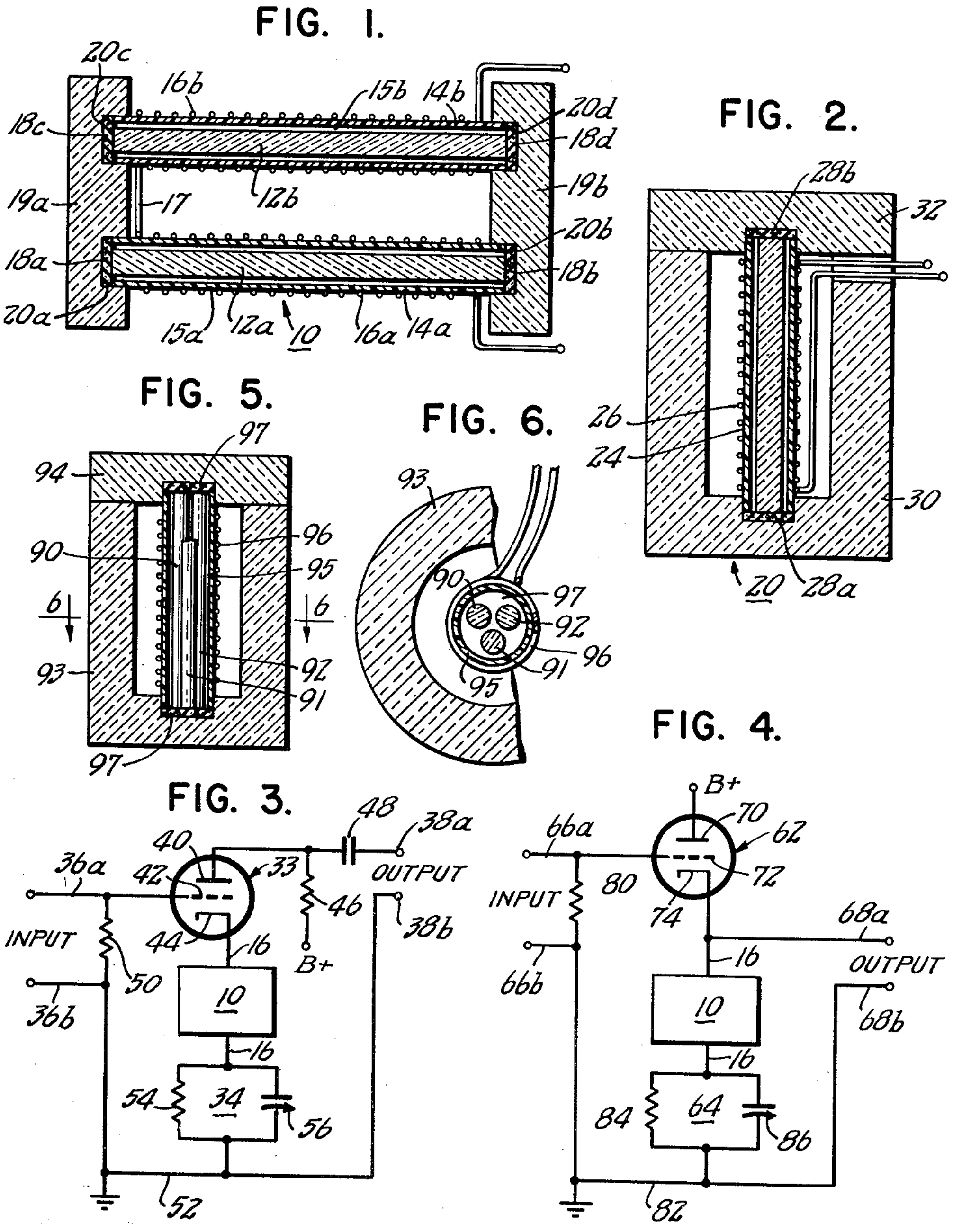
FIG. 1 is a cross-sectional view of a magnetostrictive impedance element in accordance with one embodiment of the invention.
FIG. 2 is a cross-sectional view of another magnetostrictive impedance element in accordance with another embodiment of the invention.
FIG. 3 is a schematic diagram of a band-reject filter employing a magnetostrictive impedance element of the invention.
FIG. 4 is a schematic diagram of a band-pass filter employing a magnetostrictive impedance element of the invention.
FIGS. 5 and 6 are longitudinal and cross-sectional views of another impedance element representing a further modification, FIG. 6 being taken on the line 6—6 of FIG. 5.

Briefly, in accordance with a general aspect of the invention, an impedance element is provided which comprises an elongated linear member of a ferromagnetic material. The linear member has magnetostrictive properties, i.e., it experiences a dimensional change when subjected to an applied magnetic field. A winding is disposed about the linear member, along the longitudinal axis thereof and mechanically free therefrom, for receiving a periodically varying signal which induces a periodically varying magnetic field (and, therefore, a periodically varying longitudinal dimensional change) in the linear member. A magnetic coupling member is positioned adjacent to the ends of the linear member to complete a closed magnetic circuit. The impedance element, so constructed, presents a frequency-sensitive impedance which reaches a maximum in the region of the mechanically resonant frequency of the linear member.

In one form of the invention, the impedance element comprises a single elongated magnetostrictive member forming part of a magnetic circuit defined by a core that is closed except for the gaps necessary to achieve mechanical isolation of the ends of said member with respect to adjacent arms of the core. A winding is coupled to the flux path and is preferably developed around the elongated magnetostrictive member.

In another specific form of the invention, the impedance element comprises first and second linear members of ferromagnetic material having magnetostrictive properties. Each of the linear members has a winding for receiving periodically varying signals. The windings are disposed mechanically free of their associated linear members, and first and second magnetic coupling members are disposed adjacent to corresponding ends of the linear members to complete a closed series magnetic circuit.

It should be noted that by employing two linear members having different resonant frequencies with their windings serially disposed for coupling to a signal source, a more versatile impedance element for filtering may be constructed. For example, when the mechanically resonant frequencies of the linear members are close to each other, a broader bandwidth filter is obtained which still has very sharp discrimination, while when the mechanically resonant frequencies are greatly separated, multi-bandwidth filtering is obtained.

Referring to FIG. 1, an impedance element 10 is shown in accordance with one embodiment of the invention. The impedance element 10 comprises the linear vibrator members 12(*a–b*) fabricated from a magnetostrictive metal, such as nickel, or from a magnetostrictive alloy, or from ceramic, such as magnetostrictive ferrite. These linear vibrator members may be in the form of rods, thin-walled metal tubes, thin strips or fine wires. The actual mechanical configuration of the linear vibrator members is partially dependent upon the operating frequencies desired, since the dimensions of these members determine their mechanically resonant frequencies. Rigid insulating tubular coil forms 14(*a–b*) respectively encompass the linear vibrator members 12(*a–b*), there being a radial clearance 15(*a–b*) to assure substantial mechanical freedom of members 12(*a–b*) from coil forms 14(*a–b*). Windings 16(*a–b*) are respectively developed about the tubular coil forms 14(*a–b*).

Buffering elements 18(*a–b*) of resilient material are disposed at the ends of the linear vibrator members; buffers 18(*a–b*) may be pads of air-filled rubber or of cork or the like. In particular, buffering elements 18(*a–b*) are disposed at the ends of the linear vibrator member 12*a*, and buffering elements 18(*c–d*) are disposed at the ends of the linear vibrator member 12*b*. A pair of ferromagnetic coupling members 19(*a–b*) are provided with sockets 20(*a–d*) to accommodate the ends of the tubular coil forms 14(*a–b*). In particular, the sockets 20*a* and 20*b* accommodate the tubular coil form 14*a*, and the sockets 20*c* and 20*d* accommodate the tubular coil form 14*b*. Thus, a closed magnetic circuit, defined by the serial disposition of the linear vibrator member 12*a*, the magnetic coupling member 19*a*, the linear vibrator member 12*b* and the magnetic coupling member 19*b*, is obtained.

The magnetic circuit defined by magnetostrictive elements 12(*a–b*) couplers 19(*a–b*) is preferably permanently polarized, as by permanently magnetizing one or more of the parts thereof, as for example the couplers 19(*a–b*). Thus, if a first winding 16*a* be excited with a periodically varying signal of frequency in the vicinity of the mechanically resonant frequencies of elements 12(*a–b*), then both elements 12(*a–b*) will be caused to resonate, and an output signal developed in the other winding 16*b* will reflect the influence of mechanical resonance at 12(*a–b*) on the input signal. In the form shown, however, both windings 16(*a–b*) are connected together at 17 in series-aiding relationship, so that, for any given direction of voltage change applied to winding 16(*a–b*), flux circulation in the magnetic circuit will be in the same direction, as for example, counterclockwise, that is, left-to-right in magnetostrictive member 12*a*, up in coupling member 19*b*, right-to-left in member 12*b*, and down in coupling member 19*a*. Thus, electric-signal excitation of the connected windings 16(*a–b*) develops periodically varying magnetic fields in the linear vibrator members 12(*a–b*).

It should be noted that the tubular coil forms 14(*a–b*), and the buffering elements 18(*a–b*) provide a substantially non-constrained support for the linear vibrator members 12(*a–b*) to permit a relatively undamped vibration of these members when the frequencies of the signals received by the winding 16 approach their mechanically resonant frequencies. During operation, the impedance presented by the impedance element 10 has a low value for frequencies remote from the mechanical resonant frequencies of the linear vibrator members 12(*a–b*), but in the region of their mechanically resonant frequency, there is a very abrupt rise in impedance. Thus, the impedance element 10 may be used advantageously in signal filtering.

FIG. 2 shows an impedance element 20 in accordance with another embodiment of the invention. The impedance element 20 comprises a linear vibrator member 22 similar to one of the linear vibrator members 12 of FIG. 1. Disposed about the linear vibrator member 22 and in radial-clearance relation therewith is a rigid tubular coil form 24. The winding 26 is developed about the tubular coil form 24, and, during operation, it is coupled to a periodically varying signal source. Buffering elements 28(*a–b*) are positioned at the ends of the linear vibrator member 22. The combination of the buffering elements 28 and the tubular coil form 24 will be seen to provide a substantially unconstrained mounting for the linear impedance element 22, minimizing mechanical damping of this element when excited by a signal of frequency approaching its mechanically resonant frequency.

The socketed cup 30 of a ferromagnetic material, such as a cast ferrite, accepts one end of the tubular coil form 24 and linear vibrator member 22, and the socketed disc member 32 (also of a ferrite) accepts the other end of parts 22—24. The combination of the socketed cup 30, the socketed disc 32 and the linear vibrator member 22, forms a closed magnetic circuit which permits highly efficient induction of a magnetic field by currents flowing through the winding 26; as with FIG. 1, this closed magnetic circuit is preferably permanently magnetized. The operation of the impedance element 20 is similar to the operation of the impedance element 10, it being understood that mechanically resonant properties of member 22 alone dominate the impedance of winding 26 as a function of frequency.

A preference has been indicated that core members 19 (FIG. 1) and 30—32 (FIG. 2) be permanently magnetized. This will be seen to broaden the choice of magnetostrictive material in the linear vibrator elements, since they need not be restricted to a permanently magnetizable material; furthermore, the excitation circuits which transmit signals to the windings of the impedance elements need not carry a direct-current component for establishing a magnetic bias. Therefore, more flexibility in design is possible.

Although the impedance elements 10 and 20 are similar in many respects, there is one important difference. Since the impedance element 10 includes two linear vibrator members, it is possible to obtain a device which has two different mechanically resonant frequencies. These resonant frequencies may be chosen, by suitably dimensioning the linear vibrator members, to occur in essentially adjacent frequency bands so that the overall bandwidth of the impedance element 10 is increased without material sacrifice in discrimination. However, by selecting the resonant frequencies to be distant from each other, two distinct impedance rises are obtained, and a filter element may be designed which is sensitive to two different frequency bands. A further extension of this principle may be carried to any number of linear vibrator members (all related to the same magnetic circuit and associated winding) to provide a further increase in bandwidth.

Although the impedance elements 10 and 20 may be incorporated in many conventional circuits, two typical applications will be disclosed. Accordingly, FIG. 3 shows the use of the impedance element 10 in a band-reject filter. The band-reject filter comprises a triode vacuum tube 33, with the magnetostrictive impedance element 10 and the parallel resistance-capacitance combination 34 disposed serially in its cathode circuit. When a periodically varying signal having a frequency removed from the mechanically resonant frequency of the impedance element 10 is impressed across the input terminals 36(*a–b*), the signal is amplified and transmitted from the output terminals 38(*a–b*). However, when the impressed signal has a frequency (or frequency component) near the mechanically resonant frequency, the cathode circuit becomes highly degenerative, and little or no signal (or little or no component at that frequency) is transmitted from the output terminals 38 (*a–b*).

The triode vacuum tube 33 has an anode 40, coupled via a resistor 46 to a positive direct-current potential (B-plus), and via a coupling capacitor 48 to the output terminal 38*a*. The control grid 42 of the triode vacuum tube 33 is connected to the junction of the input terminal 36*a* and one end of the resistor 50, whose other end is coupled to the junction of the input terminal 36*b* and the grounded reference line 52.

The cathode 44 of the triode vacuum tube 33 is connected to one end of the winding 16(*a–b*) of the impedance element 10; the other end of winding 16(*a–b*) is connected to one junction of the resistor 54 and the capacitor 56 of the parallel resistance-capacitance combination 34, the other junction of which is connected to the reference line 52.

Quiescently, the impedance element 10 acts as a short circuit between the cathode 44 and the parallel resistance-capacitance combination 34, permitting the resistor 54 to establish an operating bias for the triode vacuum tube 33. During the transmission of periodically varying signals having frequencies removed from the mechanically resonant frequency, the impedance of the cathode circuit remains small, thus permitting amplification of periodically varying signals. When signals are received having frequencies approaching the mechanically resonant frequency, the impedance of the impedance element 10 sharply rises to greatly diminish the amplification, with the result that a very weak signal is transmitted from the output terminals 38(*a–b*).

Thus, if the input signal sweeps through a spectrum of frequencies starting much below the mechanically resonant frequency and ending far above the resonant frequency, the output signals will show a notch in the region of the mechanically resonant frequency. In other words, all signals having frequencies removed from the resonant frequency are amplified and transmitted, and those frequencies within a band about the mechanical resonant frequency are rejected.

It should be noted, that although a triode vacuum tube is shown as the amplifying element, other multigrid vacuum tubes or transistors may be conveniently used.

FIG. 4 illustrates the use of the impedance element 10 in a band-pass filter. The band-pass filter comprises a triode vacuum tube 62, with the impedance element 10 and a parallel resistance-capacitance combination 64 disposed serially in its cathode circuit. When a periodically varying signal having a frequency removed from the mechanically resonant frequency of the magnetostrictive impedance element 10 is impressed across the input terminals 66(*a–b*), no signal is transmitted from the output terminals 68(*a–b*). However, when the impressed signal has a frequency near the mechanically resonant frequency, a signal is transmitted from the output terminals 68(*a–b*).

The triode vacuum tube 62 has an anode 70 coupled to the positive direct-current potential (B-plus). The control grid 72 of the triode vacuum tube 62 is connected to the junction of the input terminal 66a and one end of the resistor 80; the other end of resistor 80 is coupled to the junction of the input terminal 66b and the grounded reference line 82.

The cathode 74 of the triode vacuum tube 62 is connected to the junction of the output terminal 68a and one end of the winding 16(*a–b*) of the impedance element 10, the other end of which is connected to one end of the parallel resistance-capacitance combination 64. The other end of the parallel resistance-capacitance combination 64 (comprising the resistor 84 and the capacitor 86) is connected to the junction of the reference line 82 and the output terminal 68b.

Quiescently, and at frequencies removed from the mechanically resonant frequency, the impedance element 10 acts as a short circuit between the cathode 74 and the parallel resistance-capacitance combination 64, thus permitting the resistor 84 to establish an operating bias for the triode vacuum tube 82. During the transmission of periodically varying signals having frequencies removed from the mechanically resonant frequency, the impedance of the cathode circuit remains low, and hardly any signal is developed across the output terminals 68(*a–b*) connected across this impedance. When signals are received having frequencies approaching the mechanically resonant frequency, the impedance of the impedance element 10 sharply rises, permitting the development of a voltage across the output terminals 68(*a–b*).

Thus, if the input signal sweeps through a spectrum of frequencies starting much below the mechanically resonant frequency and ending far above the mechanically resonant frequency, the output signals will only be essentially from a band in the region of the mechanically resonant frequency (or frequencies, assuming elements 12a and 12b to have different resonant frequencies). In other words, the signals which are passed to the output circuit 68(*a–b*) are dominated by mechanically resonant properties of elements 12a and 12b.

It should be realized that the filter applications of FIGS. 3 and 4 are disclosed purely as examples of the incorporation of the impedance elements of the invention in particular circuits. The impedance elements 10 and 20 may be employed in any of the conventional filter and modulating circuitry in the electronics art.

In FIGS. 5 and 6, I illustrate a further form of the invention (also usable in either of the circuits of FIGS. 3 and 4), wherein plural elongated rod-type magnetostrictive elements 90—91—92 are grouped to complete a toroidal magnetic circuit comprising cup and disc elements 93—94 of ferromagnetic material, at least one of which is preferably permanently magnetized. The elements 90—91—92 are loosely contained within a non-magnetic (e.g. plastic or cardboard) coil form 95 on which a winding 96 is developed. The elements 90—91—92 may be contained within separate non-magnetic tubes, but in the form shown no provision is made for holding them in spaced relation; however, buffering means 97 is shown for mechanically isolating the ends of elements 90—91—92 from the central sockets in core members 93—94. It will be understood that if the magnetostrictive elements 90—91—92 exhibit different mechanically resonant frequencies, all three of these frequencies will contribute to dominate the electrical performance of winding 96, as for example to define a wider band-pass or band-reject function than would be obtainable if only one or two magnetostrictive elements were employed.

It will be seen that I have shown improved magnetostrictive impedance elements which, while having very sharp resonant peaks, are easily fabricated and assembled. In particular, both the structures of FIGS. 1 and 2 are inherently relatively unsusceptible to stray magnetic flux, so that they may be said to exhibit the virtues of toroidally wound ring cores while avoiding the difficulty of making a toroidal winding; in fact, the use of a tubular coil form to enclose the linear vibrator motor means that conventional inexpensive coil-winding techniques may be employed to develop windings 16(*a–b*) and 26.

Furthermore, the disclosed impedance elements permit a greater design flexibility and selection of advantageous material properties. For example, provision for permanent polarization can be made either in the properties of the linear vibrator members or in the magnetic coupling members. Thus, the selection of magnetostrictive materials need not be restricted.

While the invention has been described in detail, in connection with the preferred forms illustrated, it will be understood that modifications may be made within the scope of the invention as defined in the claims which follow.

I claim:

1. An impedance element comprising a pair of linear members of magnetostrictive material, separate casing means for each member, each casing means having substantially completely closed sides and ends within which its respective linear member is completely received in clearance relationship therewith both at the sides and ends thereof, resilient means operatively connected between the ends of each of said casing means and the corresponding ends of their respective linear members, said resilient means constituting the sole operative supports for said linear members within their respective casing means, windings carried by said casing means electrically connected to one another in aiding relation, and disposed about the linear members respectively received therewithin but spaced therefrom, and magnetic connecting means operatively connected between corresponding ends of one casing means and the other, thereby to form a substantially closed magnetic circuit with said linear members, said linear members having different resonant frequencies of vibration.

2. The impedance element of claim 1, in which the sides of said casing means are defined by a tubular non-magnetic element and the ends of said casing means are defined by magnetizable material.

3. An impedance element comprising a pair of linear members of magnetostrictive material, separate casing means for each member, each casing means having substantially completely closed sides and ends within which its respective linear member is completely received in clearance relationship therewith both at the sides and ends thereof, resilient means operatively connected between and located in the clearance between the ends of each of said casing means and the corresponding ends of their respective linear members, said resilient means constituting the sole operative supports for said linear members within their respective casing means, windings carried by said casing means electrically connected to one another in aiding relation, and disposed about the linear members respectively received therewithin but spaced therefrom, and magnetic connecting means operatively connected between corresponding ends of one casing means and the other, thereby to form a substantially closed magnetic circuit with said linear members, said linear members having different resonant frequencies of vibration.

4. The impedance element of claim 3, in which the sides of said casing means are defined by a tubular non-magnetic element and the ends of said casing means are defined by magnetizable material.

5. An impedance element comprising a plurality of linear members of magnetostrictive material having different resonant frequencies of vibration, a casing means common to said plurality of members, said casing means having substantially completely closed sides and ends within which said linear members are completely received in clearance relation therewith both at the sides and ends thereof, resilient means operatively connected between the ends of said casing means and the corresponding ends of said linear members, said resilient means constituting the sole operative support for said linear members within said casing means, a winding carried by said casing means and disposed about said linear members but spaced therefrom, and magnetic connecting means operatively connected between the ends of said casing means and extending exteriorly of said casing means, thereby to form a substantially closed magnetic circuit with said linear members.

References Cited in the file of this patent

UNITED STATES PATENTS

| | | |
|---|---|---|
| 2,170,206 | Mason | Aug. 22, 1939 |
| 2,571,019 | Donley et al. | Oct. 9, 1951 |
| 2,607,814 | Bloch | Aug. 19, 1952 |
| 2,648,060 | Turner | Aug. 4, 1953 |
| 2,652,542 | Anthony et al. | Sept. 15, 1953 |
| 2,717,981 | Apstein | Sept. 13, 1955 |
| 2,776,416 | Harris | Jan. 1, 1957 |
| 2,776,417 | Harris | Jan. 1, 1957 |
| 2,806,328 | Bradfield | Sept. 17, 1957 |
| 2,895,113 | Agar | July 14, 1959 |

OTHER REFERENCES

Publication: QST July 1953, pages 28–30, 112, 114, "Magnetostriction Devices and Mechanical Filters For Radio Frequencies," by W. V. B. Roberts.